(12) United States Patent
Michaeli et al.

(10) Patent No.: US 10,896,159 B1
(45) Date of Patent: Jan. 19, 2021

(54) SYSTEM, METHOD, AND COMPUTER PROGRAM FOR CONFIGURATION BASED COEXISTENCE ROUTING

(71) Applicant: Amdocs Development Limited, Limassol (CY)

(72) Inventors: Niv Michaeli, Hadera (IL); Noam Tamarkin, Binyamina (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 383 days.

(21) Appl. No.: 15/867,531

(22) Filed: Jan. 10, 2018

Related U.S. Application Data

(60) Provisional application No. 62/447,856, filed on Jan. 18, 2017.

(51) Int. Cl.
*G06F 16/00* (2019.01)
*G06F 16/21* (2019.01)
*G06F 16/245* (2019.01)

(52) U.S. Cl.
CPC .......... *G06F 16/214* (2019.01); *G06F 16/245* (2019.01)

(58) Field of Classification Search
CPC ............. G06F 11/1456; G06F 11/1464; G06F 11/1451; G06F 16/122; G06F 16/1744; G06F 16/21; G06F 16/22; G06F 16/4393; G06F 16/44; G06F 16/904; G06F 16/907; G06F 21/31; G06F 21/41; G06F 21/552; G06F 21/57; G06F 3/0482; G06F 3/0484; G06F 3/0485; G06F 40/30; G06F 16/337; G06F 16/23; G06F 11/3452;
(Continued)

(56) References Cited

U.S. PATENT DOCUMENTS 7,545,805 B2  6/2009  Huang et al.
7,996,413 B2  8/2011  Cotichini et al.
(Continued)

FOREIGN PATENT DOCUMENTS

WO  2008056133 A2  5/2008
WO  2013141989 A1  9/2013

*Primary Examiner* — Shyue Jiunn Hwa
(74) *Attorney, Agent, or Firm* — Zilka-Kotab, P.C.

(57) ABSTRACT

A system, method, and computer program product are provided for configuration based coexistence routing. In operation, a coexistence router system receives data from one or more systems during a coexistence period of a data migration process where information is in process of being migrated from one or more migration source systems to one or more migration target systems. The coexistence router system identifies one or more routing keys included with the data capable of being used to determine whether the data is associated with the one or more migration target systems or the one or more migration source systems. The coexistence router system queries a migration master database to determine whether the data is associated with the one or more migration target systems or the one or more migration source systems, based on the one or more routing keys. Furthermore, the coexistence router system routes the data to the one or more migration target systems or the one or more migration source systems based on the determination of whether the data is associated with the one or more migration target systems or the one or more migration source systems.

17 Claims, 7 Drawing Sheets

(58) Field of Classification Search
CPC ............... G06F 16/1734; G06F 16/178; G06F 16/2264; G06F 16/235; G06F 16/2379; G06F 16/24564; G06F 16/2457; G06F 16/9035; G06F 16/906; G06F 7/14
See application file for complete search history.

(56) References Cited

U.S. PATENT DOCUMENTS

| | | | |
|---|---|---|---|
| 8,095,606 B1 * | 1/2012 | Wiley | G06Q 10/107 709/206 |
| 8,533,233 B2 | 9/2013 | Deininger et al. | |
| 8,639,675 B2 | 1/2014 | Cotichini et al. | |
| 8,732,320 B2 | 5/2014 | Leshchiner et al. | |
| 8,984,616 B2 | 3/2015 | Jamrog et al. | |
| 2015/0254088 A1 * | 9/2015 | Chou | G06F 3/067 709/212 |
| 2016/0188710 A1 * | 6/2016 | Dulba Naik | G06F 16/212 707/737 |
| 2017/0061138 A1 * | 3/2017 | Lambert | H04L 63/0428 |

* cited by examiner

SYSTEM, METHOD, AND COMPUTER PROGRAM FOR CONFIGURATION BASED COEXISTENCE ROUTING

CLAIM OF PRIORITY AND RELATED APPLICATIONS

This application claims the benefit of U.S. Provisional Application No. 62/447,856, filed Jan. 18, 2017, the entire contents of which are incorporated herein by reference.

FIELD OF THE INVENTION

The present invention relates to updating software systems, and more particularly to migrating data associated with a migration source (e.g. legacy systems, etc.) to a migration target (e.g. new systems, etc.) in an efficient manner over time.

BACKGROUND

Any case where the same type of data (e.g. customer data, etc.) is managed by more than one system, the maintenance of the data requires a determination on which system the operation will maintain or be used to retrieve or modify the data. A typical case is a transformation to a new software system (as migration target system) from a legacy software system (as migration source system), which requires data migration. In many cases, the data migration is performed in phases that may have weeks or months between them. This period of time is known as coexistence, co-living, and/or transition period. In order for the overall system to remain functional during this coexistence period, procedures need to be implemented to ensure that service calls access the migration source or the migration target appropriately, based on the current migration status. The selection of the appropriate system is bound to change over time as migration progresses. Currently, there is not a mechanism for doing this efficiently and/or in a way that is seamless to the overall system throughout the entire migration and/or transition period.

There is thus a need for addressing these and/or other issues associated with the prior art.

SUMMARY

A system, method, and computer program product are provided for configuration based coexistence routing. In operation, a coexistence router system receives data from one or more systems during a coexistence period of a data migration process where information is in process of being migrated from one or more migration source systems to one or more migration target systems. The coexistence router system identifies one or more routing keys included with the data capable of being used to determine whether the data is associated with the one or more migration target systems or the one or more migration source systems. The coexistence router system queries a migration master database to determine whether the data is associated with the one or more migration target systems or the one or more migration source systems, based on the one or more routing keys. Furthermore, the coexistence router system routes the data to the one or more migration target systems or the one or more migration source systems based on the determination of whether the data is associated with the one or more migration target systems or the one or more migration source systems.

DETAILED DESCRIPTION

Figure 1:
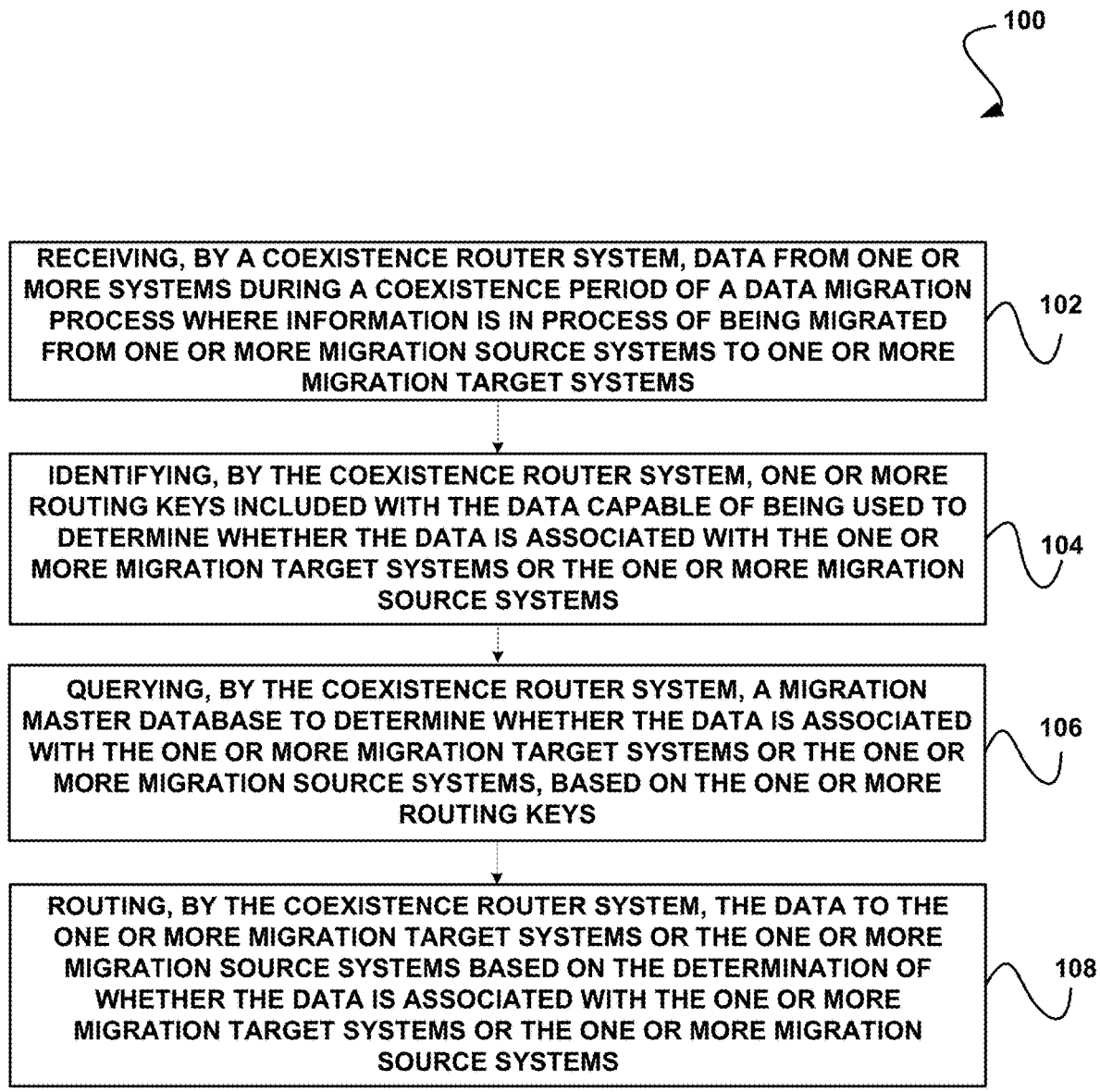
FIG. 1 illustrates a method for configuration based coexistence routing, in accordance with one embodiment.

FIG. 1 illustrates a method 100 for configuration based coexistence routing, in accordance with one embodiment.

In operation, a coexistence router system receives data from one or more systems during a coexistence period of a data or system migration process where information is in process of being migrated from one or more migration source systems (e.g. legacy systems, etc.) to one or more migration target systems (e.g. new systems, etc.). See operation 102. The coexistence router system may receive the data from a set of one or more systems during the coexistence period of a data migration in which the information can exist in a set of one or more migration source systems or a set of one or more migration target systems.

The coexistence router system identifies one or more routing keys included with the data capable of being used to determine whether the data is associated with the migration target system or the migration source system. See operation 104. For example, the data may include a service payload including the routing keys. In this case, the routing keys may be extracted from the service payload. In various embodiments, the routing keys may be configurable to enable support for any entity in various formats.

Additionally, the coexistence router system queries a migration master database to determine whether the data is associated with the migration target system or the migration source system, based on the one or more routing keys. See operation 106. In this case, in one embodiment, the coexistence router system may make a routing decision that indicates whether the data is routed to the migration target system or the migration source system. This routing decision may be based on one or more rules associated with master routing data corresponding to the migration master database. In one embodiment, the master routing data may be automatically populated during migration runs.

Additionally, the coexistence router system may process the extracted routing keys with an expression that is defined in the router configuration, to determine the routing destination.

Further, the coexistence router system routes the data to the migration target system or the migration source system based on the determination of whether the data is associated with the migration target system or the migration source system. See operation 108. The data and/or a service payload associated with the data may remain unchanged while routing the data to the migration target systems or the migration source systems.

After the data migration phase is complete, the coexistence router system can fade out gradually without effecting the IT landscape.

It should be noted that the method 100 may be implemented utilizing various systems, hardware, software, applications, user interfaces, etc., as dictated by the implementer. For example, the coexistence router system may include one or more processors, databases, etc., as well as implement various logic, computer code, applications, and/or user interfaces, etc. Further, in one embodiment, the coexistence router system may be an appliance (i.e. designated hardware and software). Still yet, in one embodiment, the coexistence router system may be implemented over cloud-based software containers.

In addition, in one embodiment, the coexistence router system may be a microservice. For example, the coexistence router system may be a standalone component containing all the data and configurations to operate. By design, the coexistence router system may have the qualities of a microservice. The coexistence router system may not rely on any specific operating system and may run on physical or virtual machines on the premise or a cloud.

As a standalone server, in one embodiment, the coexistence router system may be deployed on multiple instances in various configurations, such as active-active or active-passive, while the number of instances may vary according to a load.

In another embodiment, the deployment of the coexistence router system may also be as a microservice (e.g. Dokers, etc.) to enable cloud flexibility.

Additionally, it should be noted that the migration master database can use one or more of the following: servers, processors, storage, database software and caching solutions, etc.

In one embodiment, various aspects of the method 100 and/or other functionality described herein may be implemented either as part of the coexistence router or outside the system, and may be viewed/described in two parts. Part one may include the ongoing collection of current migration and/or transition status done during part or the entire migration and/or transition period. Part two may be the coexistence routing done one or more systems is creating, retrieving or updating data practiced during part or the entire migration and/or transition period.

Part one may also include storing data from the migration process itself on the current status of data that was migrated from one or more migration source systems to one or more migration target systems. Each such data is identified by one or more keys to indicate that this data has been processed during the data migration and/or transition process. Such data is stored in the migration master database. This techniques described herein can be used during any part of the migration and/or transition process, starting from before the migration and/or transition process starts and can last after the migration and/or transition process has been completed to facilitate the verification and validation of the success of the migration and/or transition process.

Part two may take effect when one or more systems are creating, retrieving, updating or deleting data from the system of records. In this case, the coexistence router system identifies one or more routing keys included with the data capable of being used to determine whether the data is associated with the one or more migration target systems or the one or more migration source systems. The coexistence router system queries a migration master database to determine whether the data is associated with the one or more migration target systems or the one or more migration source systems, based on the one or more routing keys. Furthermore, the coexistence router system routes the data to the one or more migration target systems or the one or more migration source systems based on the determination of whether the data is associated with the one or more migration target systems or the one or more migration source systems. This system, method and computer program product can be used during any part of the migration and/or transition process, starting from before the migration and/or transition process starts and can last after the migration and/or transition process has been completed to facilitate the verification and validation of the success of the migration and/or transition process.

All of these steps may be performed in a manner that is seamless to the system participating in the migration and/or transition process such as migration source systems, migration target systems and/or system performing actions on data during the entire migration and/or transition period.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
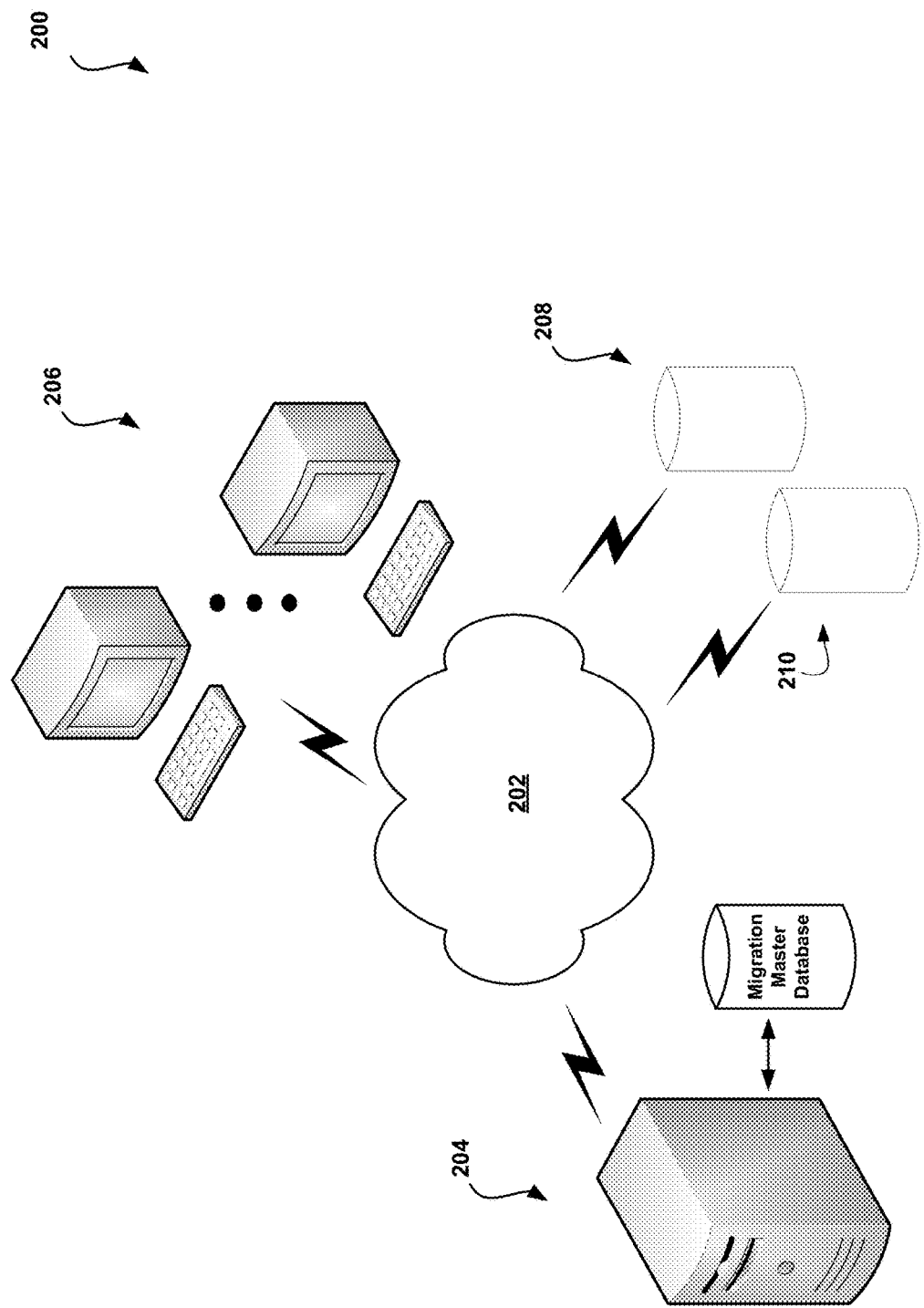
FIG. 2 shows a system for configuration based coexistence routing, in accordance with one embodiment.

FIG. 2 shows a system 200 for configuration based coexistence routing, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a coexistence router system 204, which may implement a variety of applications or software, etc. The coexistence router system 204 may be capable of communicating with a plurality of systems 206 (e.g. customer systems, etc.), either directly or over one or more networks 202, for routing data during a coexistence period. The coexistence router system 204 may also be in communication with one or more legacy systems 208 and one or more new systems 210.

Any transformation to a migration target system from a migration source system (e.g. a legacy system to a new system, etc.) requires data migration. In many cases, the data migration is performed in phases that may have weeks or months between them. This period of time is known as coexistence, co-living, transition, and/or coexistence. Once the migration has started, any service (API) call is required to be routed to either the migration target system (e.g. new system, etc.) or the migration target system (e.g. legacy system, etc.) according to the migration status of the customer or any other business entity.

The routing is based on content that is passed in the service request data that is different between systems, projects and entities. The coexistence router system 204 implements a process and a configurable tool that supports such routing.

In software projects that replace migration source systems (e.g. legacy systems, etc.) with migration target system (e.g. new systems, etc.), the data migration phase is very sensitive. The migration is frequently performed in multiple phases according to business requirements. The migrated data from the migration source system to the migration target system represents business entities such as orders, customers, accounts, invoices, and any other business entities that are relevant to the migration target systems.

The coexistence router system 204 provides service call routing during the period when business entities (e.g. customers, etc.) are managed in the migration source system and the migration target system. The routing is based on keys that represent one or more business entities. As part of the migration plan and design, these keys are defined and stored in a database (e.g. a migration master database, etc.) during the migration run. These keys will indicate whether the data (e.g. the customer data, etc.) is managed in the migration source system or the migration target system.

In operation, the coexistence router system 204 analyzes service payload data (e.g. received from the systems 206, etc.) to identify a routing key or keys. The coexistence router system 204 extracts the routing keys from the payload data. The coexistence router system 204 calls routing rule sources with the routing keys. This may include, for example, accessing a rules database and/or utilizing expressions and/or web services. Based on these rules and the routing keys, the coexistence router system 204 determines the routing endpoint (i.e. the legacy system 208 or the new system 210).

The coexistence router system 204 transforms the data and protocol to the proper form (as required). The coexistence router system 204 also runs a process to mitigate functionality gaps associated with the data.

By implementing this solution, the service payload is not changed during routing (e.g. other than possibly formatting, etc.). Further, routing keys and data entities are configurable to enable support for any entity in any format. Moreover, the coexistence router system 204 supports any protocol of a service consumer and service provider.

Routing decisions may be based on the configuration and routing data in the migration master database. The migration master database may be automatically populated during migration runs. Consumer, provider, and migration master database entities are connected via a special set of adaptors included with the coexistence router system 204 including a consumer adaptor and a provider adapter.

The consumer adaptor includes a server proxy to support any consumer protocol. In case of HTTP based protocols such as SOAP or REST, there may be a single proxy for such service in the project that need coexistence. Once the routing decision is set, the consumer adaptor will call the provider proxy and pass the service request payload. On response, the consumer adaptor will pass-through the response to the consumer, including provider errors. Additionally, the protocols support can be extended by adding protocol adaptors without any change in the router itself.

The coexistence router system 204 manages the routing decision process. The coexistence router system 204 calls the routing configuration and migration master database to get and return the routing decision in the form of the provider proxy reference.

A routing configurator may be used to hold configurations to identify the routing key in the service request payload and the endpoint for the migration source system and the migration target system.

The migration master database is a repository of business entity keys along with their migration status. The migration master database may be updated during migration runs.

The provider adaptor (both new and legacy) serves as an adaptor to any service provider, legacy or new. In the case of HTTP based protocols such as SOAP or REST, there is a single proxy for such service in the project that needs coexistence. Additionally, the protocols support can be extended by adding protocol adaptors without any change in the router itself.

The coexistence router logic implemented by the coexistence router system 204 causes the coexistence router system 204 to analyze service payload data to identify routing keys. The service message contains the key for the routing. The coexistence router configuration holds the path or logic (e.g. XPath, etc.) to find the key or keys for the routing itself. Based on the configuration, the routing keys may be extracted from the payload data for the next step, routing rule determination.

In one embodiment, there may be three different sources/forms to make the decision for routing: 1) a web service/API that takes the routing key as input and returns the routing decision (this alternative may utilize sophisticated processing and a rules engine, etc.); 2) a database that allows queries based on the routing keys as parameters; and 3) expressions that take the routing key as a base for manipulation and comparison to make the routing decision.

Based on this, the coexistence router system 204 determines the routing endpoint. The coexistence router system 204 takes the endpoint and chooses the adaptor to handle this endpoint service. Calling the endpoint service may require the adaptor to: 1) transform the data to a provider service API; 2) adapt the data to the provider system protocol, security, volumes, etc.; and 3) run a complex process to mitigate functionality gaps. This may include, for example, composing a few API calls in the provider systems to mimic a single API call for the consumer system. As another example, this may include calling the same API a few times to mimic a series of calls from the consumer while keeping the data in a cache for the next call.

In cases that the response is asynchronous, the coexistence router system 204 will also be called in the outbound call in order to capture the data for the routing key of the inbound call (e.g. data such as transaction ID, etc.). These ad-hoc routing keys will be used as described previously.

With respect to microservices, microservices expose APIs, usually a REST API. From the point of view of the coexistence router system 204, in one embodiment, microservices may be considered as any REST API. Since microservices are a new concept, it may be assumed in one embodiment that a microservice would replace an existing legacy system service/API. In this case, the coexistence router system 204 may expose the REST API of the microservice and the routing may be between the microservice and the legacy system service/API (also in the case that a microservice replaces another microservice, etc.).

In one embodiment, the coexistence router system 204 may include a Java engine that can be easily deployed and easily removed at end of a coexistence period by configuring endpoints. The coexistence router system 204 offers configuration based routing with no code. Configuration may include several routing modes (e.g. by key matching, by expression, by DB query, etc.), routing endpoints, and multi way routing (e.g. an API call can be routed to more than two providers, legacy or new). The coexistence router system 204 also supports a dynamic build of routing rules by reserving routing data on-the-fly. Moreover, the coexistence router system 204 supports any data, protocol and process for sync/a-sync APIs, all with minimal latency overhead.

Figure 3:
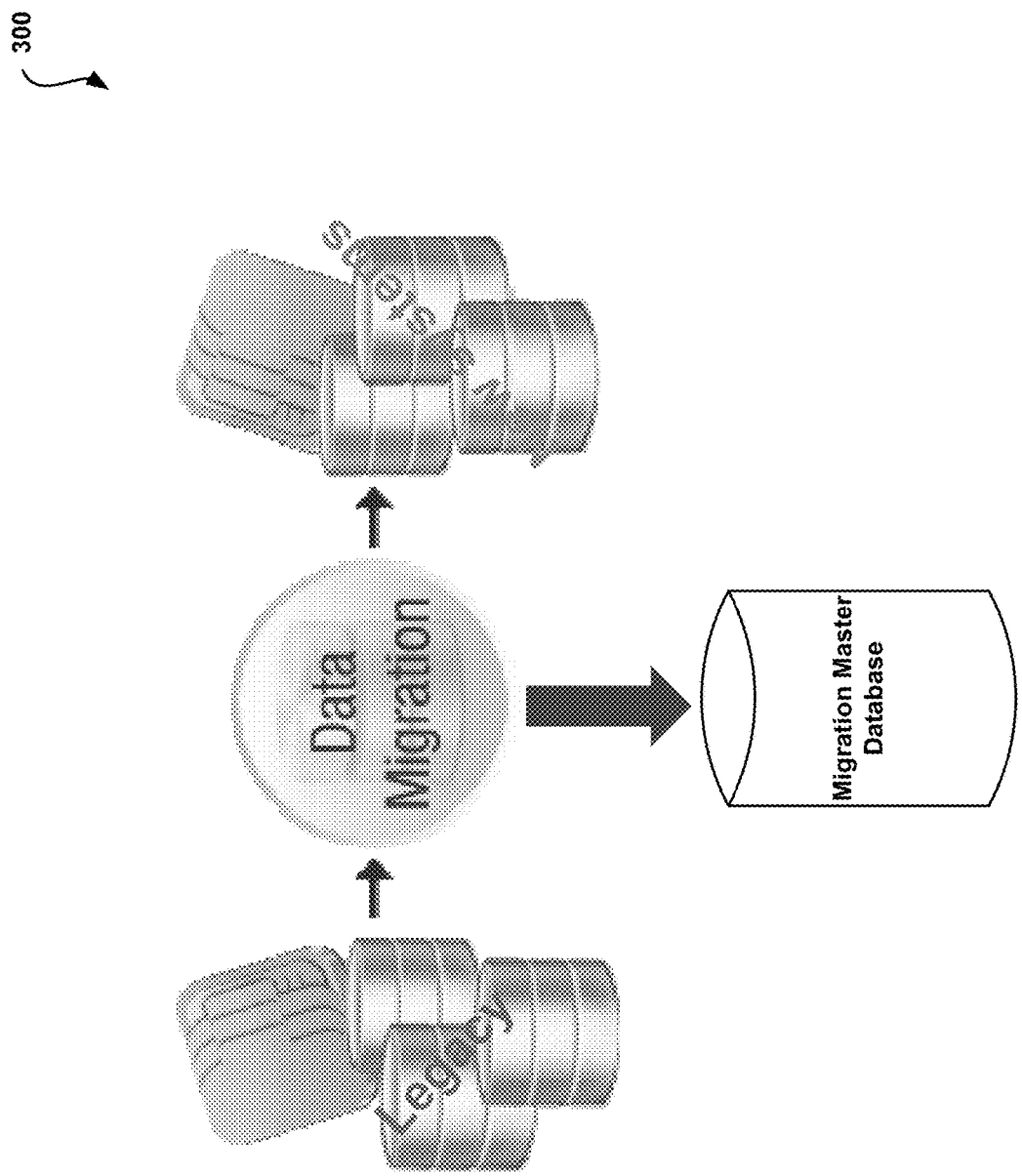
FIG. 3 shows a system flow diagram for configuration based coexistence routing, in accordance with one embodiment.

FIG. 3 shows a system flow diagram 300 for configuration based coexistence routing, in accordance with one embodiment. As an option, the flow diagram 300 may be implemented in the context of the details of the previous figures and/or any subsequent figure(s). Of course, however, the flow diagram 300 may be implemented in the context of any desired environment. Further, the aforementioned definitions may equally apply to the description below.

During software system updates, data is migrated from migration source systems (e.g. legacy systems) to initiate the migration target systems (e.g. new systems). Migration is usually performed in phases and not in one instance. During this period, known as the coexistence period, legacy systems still run parts of the business processes. The coexistence period is the period of time between the first migration run and the last migration run (and sometimes beyond).

To address this, in operation a coexistence router system will implement a migration process and will record the migrated entities in a migration master database. The migration master database may hold keys and other data of the migrated entities (e.g. customer, etc.). The migration master database may indicate which entities were migrated.

The coexistence router system can be used during any part of the coexistence period, starting from before the coexistence period to facilitate migration and/or transition process start without impact on overall system and can last after the coexistence period to facilitate the verification and validation of the success of the migration and/or transition process. Before the coexistence period the migration master database will be empty and all data creation, retrieval, update or deletions will be forwarded to migration source system. As migration progresses, data manipulation will be routed to the migration target system. Once migration and/or transition process completes, all data manipulation should be routed to the migration target system. At this point validation and verification of migration process will be enabled by monitoring the calls to migration source system over time to indicate no calls are made.

Figure 4:
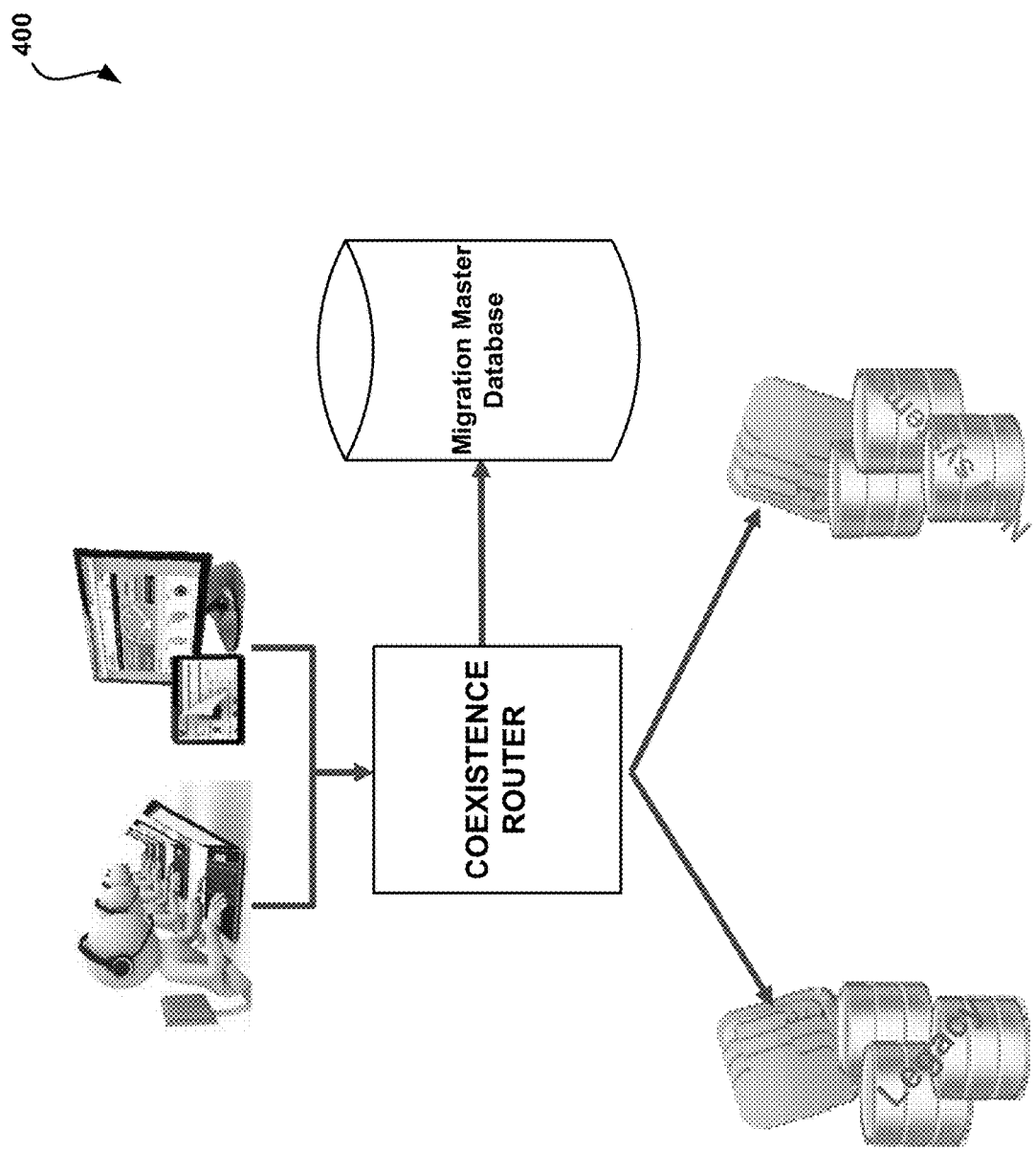
FIG. 4 shows a system flow diagram for configuration based coexistence routing, in accordance with one embodiment.

FIG. 4 shows a system flow diagram 400 for configuration based coexistence routing, in accordance with one embodiment. As an option, the flow diagram 400 may be implemented in the context of the details of the previous figures and/or any subsequent figure(s). Of course, however, the flow diagram 400 may be implemented in the context of any desired environment. Further, the aforementioned definitions may equally apply to the description below.

In operation, a consumer system calls the coexistence router system with a service call. The coexistence router queries the migration master database to identify whether the required data was migrated or not. The coexistence router calls either the migration source e.g. legacy system or the migration target system (e.g. new system) based on migration master database indications. Any data, protocol and process adaptation is performed within a coexistence adaptor, which is included with the coexistence router.

Figure 5:
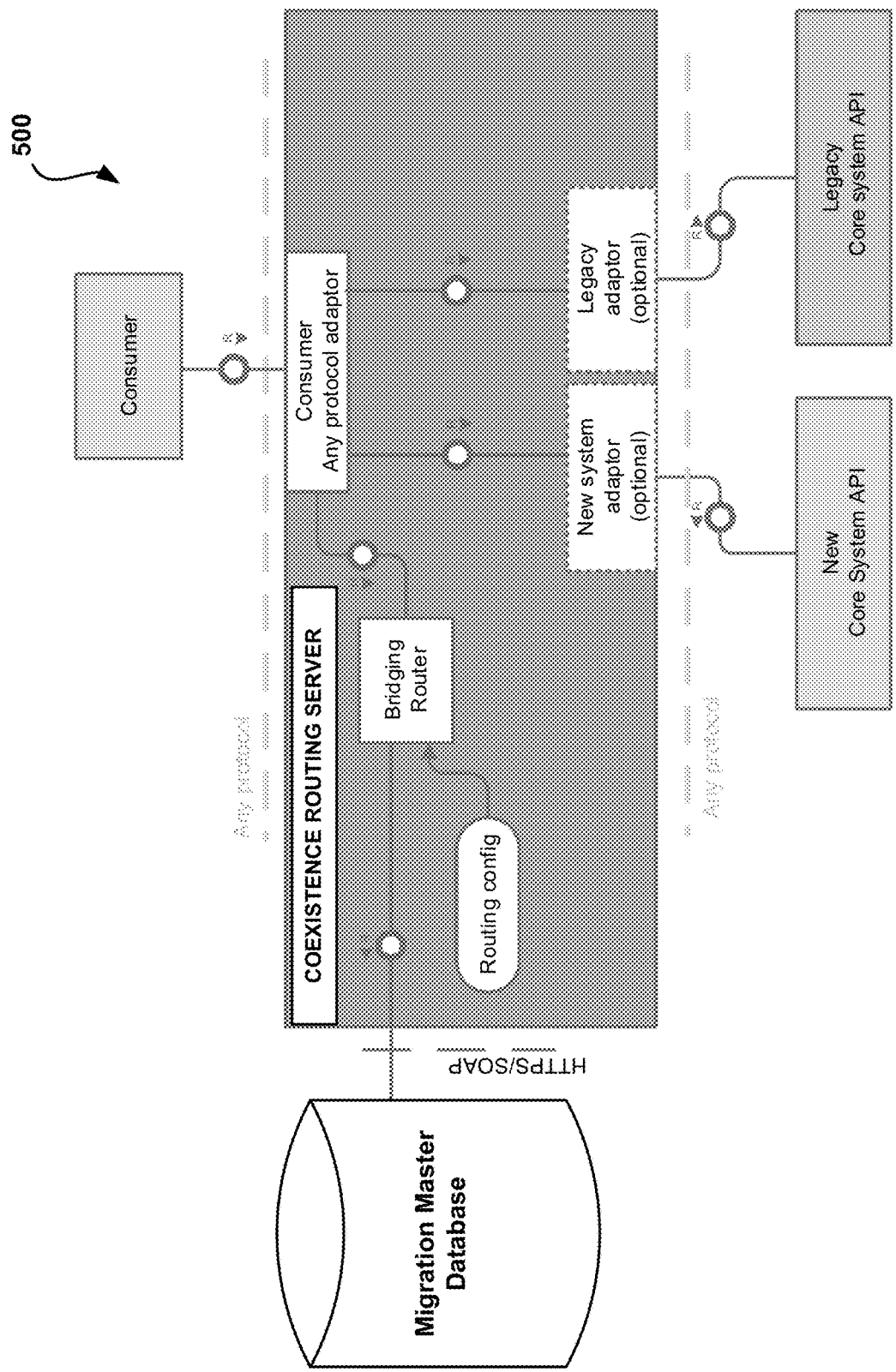
FIG. 5 shows an architecture for a coexistence router, in accordance with one embodiment.

FIG. 5 shows an architecture 500 for a coexistence router, in accordance with one embodiment. As an option, the architecture 500 may be implemented in the context of the details of the previous figures and/or any subsequent figure(s). Of course, however, the architecture 500 may be implemented in the context of any desired environment. Further, the aforementioned definitions may equally apply to the description below.

In operation, the coexistence router: 1) analyzes service payload data; 2) identifies routing keys in the data; 3) calls routing rule sources with routing keys; 4) determines the routing endpoint; 5) transforms the data and protocol; and 6) runs any processes to bridge functionality gaps.

Figure 6:
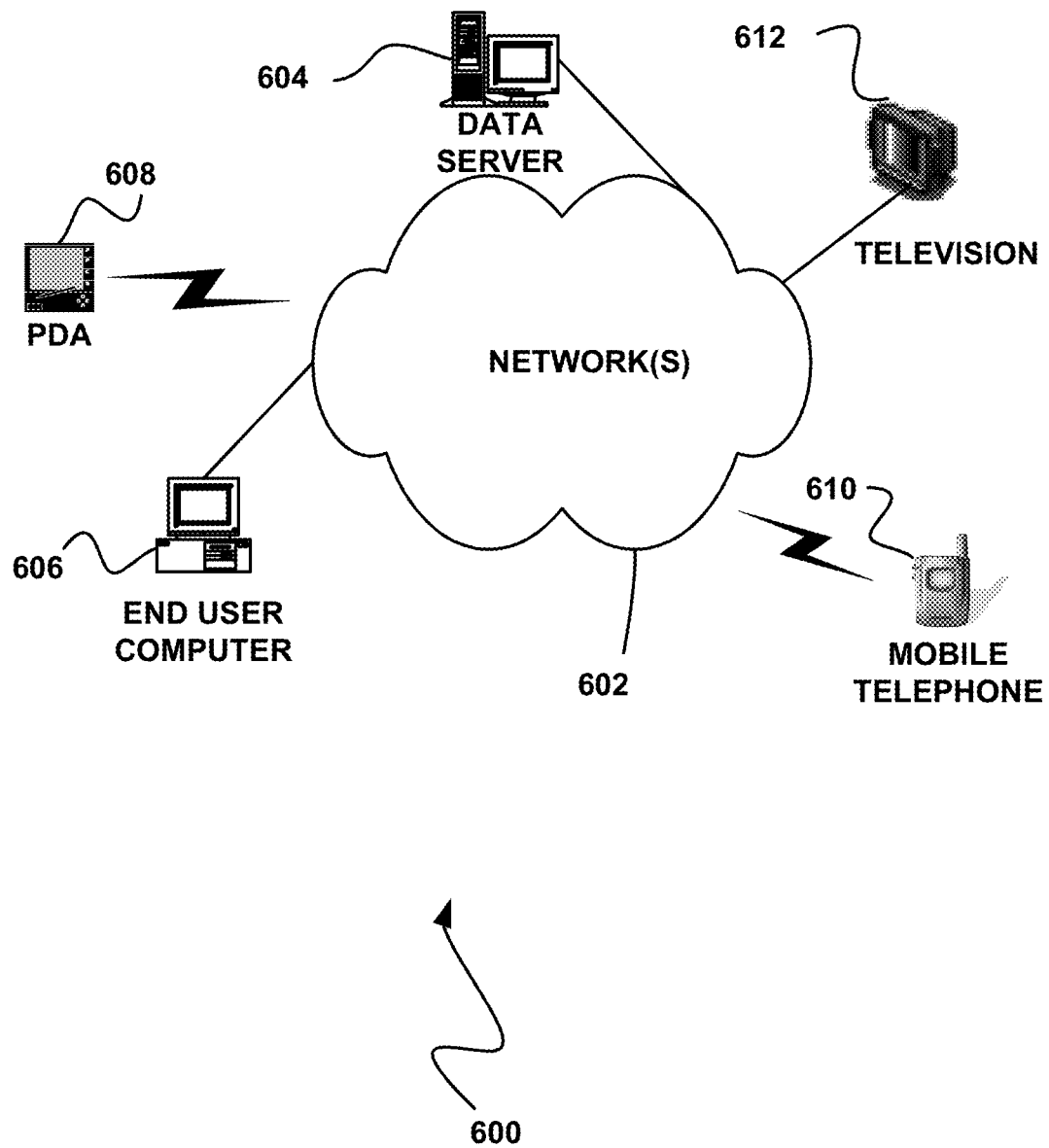
FIG. 6 illustrates a network architecture, in accordance with one possible embodiment.

FIG. 6 illustrates a network architecture 600, in accordance with one possible embodiment. As shown, at least one network 602 is provided. In the context of the present network architecture 600, the network 602 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 602 may be provided.

Coupled to the network 602 is a plurality of devices. For example, a server computer 604 and an end user computer 606 may be coupled to the network 602 for communication purposes. Such end user computer 606 may include a desktop computer, lap-top computer, and/or any other type of logic. Still yet, various other devices may be coupled to the network 602 including a personal digital assistant (PDA) device 608, a mobile phone device 610, a television 612, etc.

Figure 7:
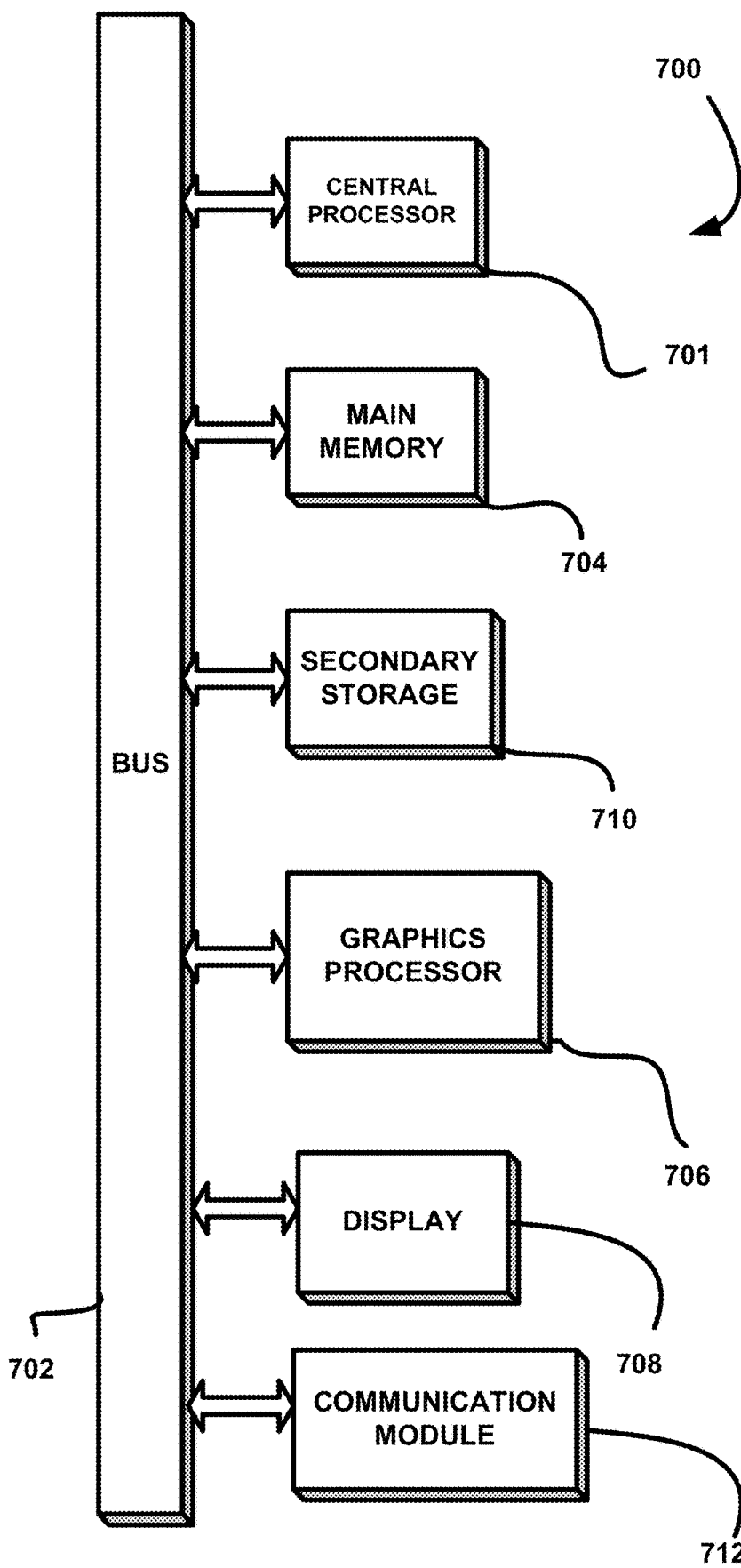
FIG. 7 illustrates an exemplary system, in accordance with one embodiment.

FIG. 7 illustrates an exemplary system 700, in accordance with one embodiment. As an option, the system 700 may be implemented in the context of any of the devices of the network architecture 600 of FIG. 6. Of course, the system 700 may be implemented in any desired environment.

As shown, a system 700 is provided including at least one central processor 701 which is connected to a communication bus 702. The system 700 also includes main memory 704 [e.g. random access memory (RAM), etc.]. The system 700 also includes a graphics processor 706 and a display 707.

The system 700 may also include a secondary storage 710. The secondary storage 710 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 704, the secondary storage 710, and/or any other memory, for that matter. Such computer programs, when executed, enable the system 700 to perform various functions (as set forth above, for example). Memory 704, storage 710 and/or any other storage are possible examples of non-transitory computer-readable media.

The system 700 may also include one or more communication modules 712. The communication module 712 may be operable to facilitate communication between the system 700 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:
1. A method, comprising:
interfacing a migration source system;
interfacing a migration target system;
during a coexistence period of a data migration process where data of the migration source system is in process of being migrated to the migration target system, storing in a migration master database for each entity of a plurality of entities included in the data:
a routing key for the entity included in the data, and
an indication that defines whether the entity has been migrated yet to the migration target system;
receiving a service call related to at least one entity of the plurality of entities;
identifying one or more routing keys included with the service call;
querying the migration master database using the one or more routing keys identified from the service call to determine whether the at least one entity related to the service call has been migrated yet to the migration target system;
routing the service call to the migration source system when a result of the query indicates that the at least one entity related to the service call has not yet been migrated to the migration target system; and routing the service call to migration target system when a result of the query indicates that the at least one entity related to the service call has been migrated to the migration target system;

wherein the data migration process is performed in phases, and wherein the coexistence period is a period of time between a first migration run and a last migration run.

2. The method of claim 1, wherein the service call includes a service payload including the one or more routing keys.

3. The method of claim 2, wherein the one or more routing keys are extracted from the service payload.

4. The method of claim 2, wherein the service payload remains unchanged while routing the service call.

5. The method of claim 1, wherein the routing keys stored in the migration master database are configurable to enable support for any entity in various formats.

6. The method of claim 1, wherein data and a protocol associated with the service call is transformed prior to routing the service call.

7. The method of claim 1, wherein the service call is received from a consumer system.

8. A computer program product embodied on a non-transitory computer readable medium, comprising computer code for:
  interfacing a migration source system;
  interfacing a migration target system;
  during a coexistence period of a data migration process where data of the migration source system is in process of being migrated to the migration target system, storing in a migration master database for each entity of a plurality of entities included in the data:
    a routing key for the entity included in the data, and
    an indication that defines whether the entity has been migrated yet to the migration target system;
  receiving a service call related to at least one entity of the plurality of entities;
  identifying one or more routing keys included with the service call;
  querying the migration master database using the one or more routing keys identified from the service call to determine whether the at least one entity related to the service call has been migrated yet to the migration target system;
  routing the service call to the migration source system when a result of the query indicates that the at least one entity related to the service call has not yet been migrated to the migration target system; and
  routing the service call to migration target system when a result of the query indicates that the at least one entity related to the service call has been migrated to the migration target system;
  wherein the data migration process is performed in phases, and wherein the coexistence period is a period of time between a first migration run and a last migration run.

9. The computer program product of claim 8, wherein the service call includes a service payload including the one or more routing keys.

10. The computer program product of claim 9, wherein the one or more routing keys are extracted from the service payload.

11. The computer program product of claim 9, wherein the service payload remains unchanged while routing the service call.

12. The computer program product of claim 8, wherein the routing keys stored in the migration master database are configurable to enable support for any entity in various formats.

13. A coexistence router system, operable for:
  interfacing a migration source system;
  interfacing a migration target system;
  during a coexistence period of a data migration process where data of the migration source system is in process of being migrated to the migration target system, storing in a migration master database for each entity of a plurality of entities included in the data:
    a routing key for the entity included in the data, and
    an indication that defines whether the entity has been migrated yet to the migration target system;
  receiving a service call related to at least one entity of the plurality of entities;
  identifying one or more routing keys included with the service call;
  querying the migration master database using the one or more routing keys identified from the service call to determine whether the at least one entity related to the service call has been migrated yet to the migration target system;
  routing the service call to the migration source system when a result of the query indicates that the at least one entity related to the service call has not yet been migrated to the migration target system; and
  routing the service call to migration target system when a result of the query indicates that the at least one entity related to the service call has been migrated to the migration target system;
  wherein the data migration process is performed in phases, and wherein the coexistence period is a period of time between a first migration run and a last migration run.

14. The coexistence router system of claim 13, wherein the service call includes a service payload including the one or more routing keys.

15. The coexistence router system of claim 14, wherein the one or more routing keys are extracted from the service payload.

16. The coexistence router system of claim 14, wherein the service payload remains unchanged while routing the service call.

17. The coexistence router system of claim 13, wherein the routing keys stored in the migration master database are configurable to enable support for any entity in various formats.

* * * * *